US009535288B2

(12) United States Patent
Chen et al.

(10) Patent No.: US 9,535,288 B2
(45) Date of Patent: Jan. 3, 2017

(54) LIQUID CRYSTAL DISPLAY DEVICE AND ITS MANUFACTURING METHOD

(71) Applicant: BOE TECHNOLOGY GROUP CO., LTD., Beijing (CN)

(72) Inventors: Liqiang Chen, Beijing (CN); Tao Gao, Beijing (CN); Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 189 days.

(21) Appl. No.: 14/501,183

(22) Filed: Sep. 30, 2014

(65) Prior Publication Data
US 2015/0362779 A1 Dec. 17, 2015

(30) Foreign Application Priority Data

Jun. 12, 2014 (CN) .......................... 2014 1 0262174

(51) Int. Cl.
*G02F 1/1335* (2006.01)
*G02F 1/13363* (2006.01)

(52) U.S. Cl.
CPC ..... *G02F 1/13363* (2013.01); *G02F 1/133553* (2013.01); *G02F 2001/133565* (2013.01);
(Continued)

(58) Field of Classification Search
CPC ................. G02F 1/13363; G02F 2001/133635
See application file for complete search history.

(56) References Cited

U.S. PATENT DOCUMENTS 6,280,889 B1    8/2001  Hsieh et al.
6,373,541 B1 *  4/2002  Sekime ................. G02F 1/1396
                                                          349/113
(Continued)

FOREIGN PATENT DOCUMENTS

CN    1247326 A    3/2000
CN    1270326 A    10/2000
(Continued)

OTHER PUBLICATIONS

First Office Action regarding Chinese application No. 201410262174.5, dated Apr. 27, 2016. Translation provided by Dragon Intellectual Property Law Firm.

*Primary Examiner* — Phu Vu
(74) *Attorney, Agent, or Firm* — Harness, Dickey & Pierce, P.L.C.

(57) ABSTRACT

The present invention relates to the field of display technology, provides a liquid crystal display device and its manufacturing method. The liquid crystal display device includes a liquid crystal layer, a color film layer and a polarizer arranged at one side of the liquid crystal layer, and a reflective layer arranged at the other side of the liquid crystal layer. The color film layer includes a plurality of pixels consisting of red, green and blue subpixels. The liquid crystal display device further includes a compensating module which includes a compensating unit corresponding to the plurality of subpixels, the compensating unit is configured to adjust phase difference offset of light rays of the corresponding subpixels when the light rays pass through the compensating unit, so that a phase difference between the light rays passing through the corresponding subpixels in a normally-black mode and/or a normally-white mode is within a predetermined range.

18 Claims, 4 Drawing Sheets

(52) U.S. Cl.
CPC ............ *G02F 2001/133638* (2013.01); *G02F 2203/02* (2013.01); *G02F 2203/62* (2013.01)

(56) References Cited

U.S. PATENT DOCUMENTS

| | | | |
|---|---|---|---|
| 7,075,602 B2* | 7/2006 | Sugiura | G02F 1/1393 349/113 |
| 2003/0160918 A1* | 8/2003 | Rho | G02F 1/133555 349/113 |
| 2011/0013121 A1* | 1/2011 | Kashima | G02B 5/201 349/86 |

FOREIGN PATENT DOCUMENTS

| | | |
|---|---|---|
| CN | 1578927 A | 2/2005 |
| CN | 203260587 U | 10/2013 |
| JP | 4802634 B2 | 10/2011 |

* cited by examiner

LIQUID CRYSTAL DISPLAY DEVICE AND ITS MANUFACTURING METHOD

CROSS-REFERENCE TO RELATED APPLICATION

The present application claims a priority of the Chinese patent application No. 201410262174.5 filed on Jun. 12, 2014, which is incorporated herein by reference in its entirety.

FIELD OF THE INVENTION

The present invention relates to the field of display technology, in particular to a liquid crystal display device and its manufacturing method.

DESCRIPTION OF THE PRIOR ART

Liquid crystal displays (LCDs) have been widely used in various electronic products. Among these LCDs, a reflective LCD uses a liquid crystal panel to modulate incident light rays from a surface of a front substrate and reflects the light rays toward a reflector on a rear surface of the display panel. Such reflective LCD requires no backlight source, which thus results in a reduction in the power consumption. Hence, it is suitable for a personal digital assistant as well as the other mobile devices.

The reflective LCD mainly includes a master-slave display system where no polarizer is used and a single polarizer system where only one polarizer is used. Usually, in order to cooperate with the polarizer and the liquid crystals to control the light and dark of the reflected light rays, a phase retarder is normally required to be arranged between the polarizer and liquid crystals, a voltage is applied to control the rotation of liquid crystal molecules, thereby to control the phase of the reflected light rays, along with adjustment on the phase of the reflected light rays by the phase retarder, the alternative dark and light of the reflected light rays is achieved. The modulation of the phase $\Delta\phi$ for a liquid crystal layer and the phase retarder may be expressed as:

$$\Delta\varphi = \frac{2\pi}{\lambda}(\Delta n_L * d_L + \Delta n_F * d_F),$$

wherein $\Delta n_L$ represents the anisotropy of a refractive index of the liquid crystals, $d_L$ represents thickness of a liquid crystal cell, $\Delta n_F$ represents the anisotropy of a refractive index of the phase retarder, and $d_F$ represents thickness of the phase retarder.

If it is required to switch the display mode between a black mode and a white mode, a formula $\Delta\phi_1-\Delta\phi_2=\pi*(m+\frac{1}{2})$ must be met, wherein $\Delta\phi_1$ and $\Delta\phi_2$ represent phase changes corresponding to the black and white modes, respectively.

It should be appreciated that, the above formula is merely provided with respect to the light rays with a single wavelength, and for the light rays with different wavelengths, the refractive index of the liquid crystal layer and that of the phase retarder are different from each other. Hence, in the case that the liquid crystal layer and the phase retarder each have a fixed thickness, the above formula will not be fully met for the entire visible region. Therefore, the light rays will not be blocked fully when a dark state is displayed, which leads to the contrast decreasing. Or the chromatic aberration will occur while displaying a bright state due to different modulation degrees of the light rays.

In order to overcome the above defect, the Chinese patent CN1270326A provides a method of manufacturing liquid crystal cells with different thicknesses for phase compensation. However, this method is complex, and it is required to accurately control the thickness of the liquid crystal cell and a longitudinal axis direction of the liquid crystal molecules. As a result, the production cost will increase.

SUMMARY OF THE INVENTION

An object of the present invention is to provide a liquid crystal display device and its manufacturing method, so as to prevent, for an existing liquid crystal display, a reduction in the contrast while light rays with different wavelengths cannot be fully blocked in a dark state, and to prevent the chromatic aberration in a bright state due to different modulation degrees of the light rays.

In one aspect, one embodiment of the present invention provides a liquid crystal display device, including a liquid crystal layer, a color film layer and a polarizer arranged at one side of the liquid crystal layer, and a reflective layer arranged at the other side of the liquid crystal layer. The color film layer includes a plurality of pixels consisting of red, green and blue subpixels. The liquid crystal display device further includes:

a compensating module which includes a compensating unit corresponding to the plurality of subpixels, the compensating unit is configured to adjust phase difference offset of light rays of corresponding subpixels when the light rays pass through the compensating unit, so that a phase difference between the light rays passing through the corresponding subpixels in a normally-black mode and/or a normally-white mode is within a predetermined range.

Alternatively, the compensating unit includes a film layer and a first electrode layer arranged at one side of the film layer. The first electrode layer includes subelectrodes each corresponding to the subpixel, and the subelectrode is configured to adjust a refractive index of a corresponding film layer region under the effect of a voltage, so as to adjust the phase difference offset of the light rays of the corresponding subpixel when the light rays pass through the compensating unit.

Alternatively, the liquid crystal display device further includes a control unit configured to control a voltage of the subelectrodes in the first electrode layer corresponding to the respective subpixels, so as to adjust the refractive index of the corresponding film layer region.

Alternatively, the liquid crystal display device further includes a second electrode layer arranged at the other side of the film layer, and the second electrode layer is a common electrode.

Alternatively, the common electrode is an electrode plate or a plurality of subelectrodes corresponding to a first electrode.

Alternatively, the subelectrodes corresponding to the red, green or blue subpixels respectively are connected parallel to each other.

Alternatively, the film layer is made of a polymer having an electro-optical effect.

Alternatively, the polymer is a polyimide-based polymer.

Alternatively, the liquid crystal display device further includes a glass substrate and a black matrix arranged between the color film layer and the glass substrate.

In another aspect, one embodiment of the present invention further provides a method for manufacturing a liquid crystal display device, including:

forming a color film layer having red, green and blue subpixels; and forming, at one side of the color film layer, a film layer for adjusting phase difference offset of light rays of the corresponding subpixels, and forming, at a side of the film layer, subelectrodes corresponding to the respective subpixels.

Alternatively, the subelectrode is formed by etching an ITO material.

Alternatively, the subelectrodes corresponding to the red subpixels are connected parallel to each other, the subelectrodes corresponding to the green subpixels are connected parallel to each other, and subelectrodes corresponding to the blue subpixels are connected parallel to each other.

Alternatively, the method further includes forming an array substrate and a polarizer, and forming a reflective layer at one side of the array substrate.

Alternatively, prior to forming the film layer and the subelectrodes, the method further includes a step of forming a black matrix and the color film layer sequentially on a glass substrate.

Alternatively, the film layer is made of a polyimide-based polymer.

Alternatively, the method further includes depositing a second electrode layer by spattering on the polarized film layer.

Alternatively, the method further includes forming a liquid crystal layer on the second electrode layer.

Alternatively, the liquid crystal layer has a thickness so that:

(1) when no voltage is applied, a phase difference introduced by the liquid crystal layer $\lambda_G$ is 90°; and (2) when a saturated voltage is applied, the phase difference introduced by the liquid crystal layer for $\lambda_G$ is 0°.

Alternatively, the method further includes forming a polarizer at the side of the color film layer where the film layer is arranged.

The embodiments of the present invention have the following advantageous effect. The liquid crystal display device is provided with the compensating unit corresponding to the subpixels, and the compensating unit adjusts the phase difference offset of the light rays of the corresponding subpixels while the light rays passing therethrough the compensating unit, so that the phase difference between the light rays passing through the corresponding subpixels in the normally-black mode and/or the normally-white mode is within the predetermined range. As a result, it is able to adjust the phase difference offset of the light rays passing through the respective subpixels, and enable the phase differences of the light rays passing through the respective subpixels to match each other, thereby to reduce the chromatic aberration.

DETAILED DESCRIPTION OF THE PREFERRED EMBODIMENTS

In order to make the objects, the technical solutions and the advantages of the present invention clearer, the present invention will be described hereinafter in conjunction with the drawings and the embodiments.

Figure 1:
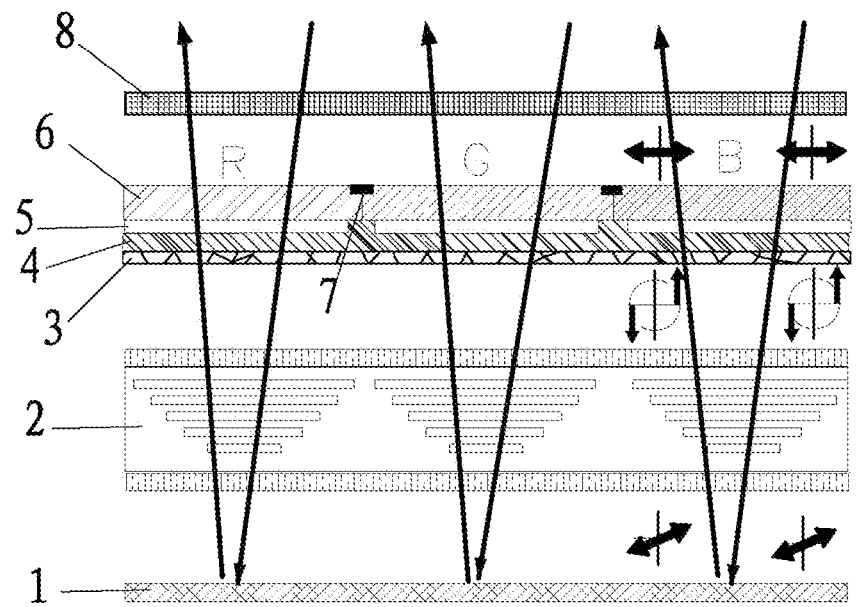
FIG. 1 is a schematic view showing a liquid crystal display device according to one embodiment of the present invention.
Figure 3:
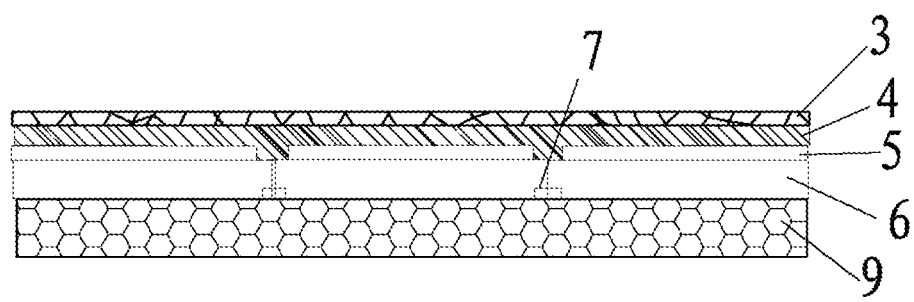
FIG. 3 is a partial schematic view of FIG. 1.

FIGS. 1 and 3 show a schematic view of a liquid crystal display device according to one embodiment of the present invention, which includes a liquid crystal layer 2, a color film layer 6 and a polarizer 8 arranged at one side of the liquid crystal layer, and a reflective layer 1 arranged at the other side of the liquid crystal layer. The color film layer includes a plurality of pixels consisting of red, green and blue subpixels. The liquid crystal display device further includes a compensating module which includes a compensating unit corresponding to the plurality of subpixels, the compensation module is configured to adjust phase difference offset of light rays of the corresponding subpixels when the light rays pass through the compensating unit, so that a phase difference between the light rays passing through the corresponding subpixels in a normally-black mode and/or a normally-white mode is within a predetermined range.

The liquid crystal display device of the embodiment of the present invention is provided with the compensating unit corresponding to the subpixels, and the phase difference offset of the light rays for the corresponding subpixels is adjusted by the compensating unit when the light rays pass therethrough, so that the phase difference between the light rays passing through the corresponding subpixels in the normally-black mode and/or the normally-white mode is within the predetermined range. As a result, it is able to adjust the phase difference offset of the light rays passing through the respective subpixels, and enable the phase differences of the light rays passing through the respective subpixels to match each other, thereby to reduce chromatic aberration.

The compensating unit in this embodiment is configured to adjust the phase difference offset of the light rays of the corresponding subpixels when the light rays pass through the compensating unit, and it may be set with respect to one kind of the subpixels, or all the subpixels. The pixels include the red, green and blue subpixels, so the compensating unit may be set with respect to each kind of subpixels, so as to adjust the refractive index of the light rays of the corresponding subpixels when the light rays pass through the compensating unit. Preferably, a ratio of the phase differences offsets for the red, green and blue subpixels may be adjusted within a ratios range of 0.9-1.1, preferably 0.95-1.05, and more preferably 1, i.e., the light rays passing through the red, green and blue subpixels have the same phase difference. As a result, it is able to reduce the chromatic aberration to the greatest extent.

A reflective liquid crystal display device uses a liquid crystal panel to modulate the incident light rays from a surface of a front substrate and reflects the light rays to a reflector on a rear surface of a display panel. According to the light rays of the corresponding subpixels, the phase difference between the incident light rays incoming into the polarizer and emergent light rays exiting from the polarizer is expressed as:

$$\Delta\varphi = \frac{2\pi}{\lambda}(\Delta n_L * d_L + \Delta n_F * d_F),$$

wherein $\Delta n_L$ represents anisotropy of a refractive index of liquid crystals, $d_L$ represents a liquid crystal cell thickness, $\Delta n_F$ represents anisotropy of a refractive index of a phase retarder, $d_F$ represents a thickness of the phase retarder, and $\lambda$ represents a wavelength.

In the normally-black mode, it is required to meet a formula $$\Delta\phi = \pi*(m-\tfrac{1}{2}),$$

while in the normally-white mode, it is required to meet a formula $$\Delta\phi = \pi*m,$$

wherein m is a natural number.

Figure 2:
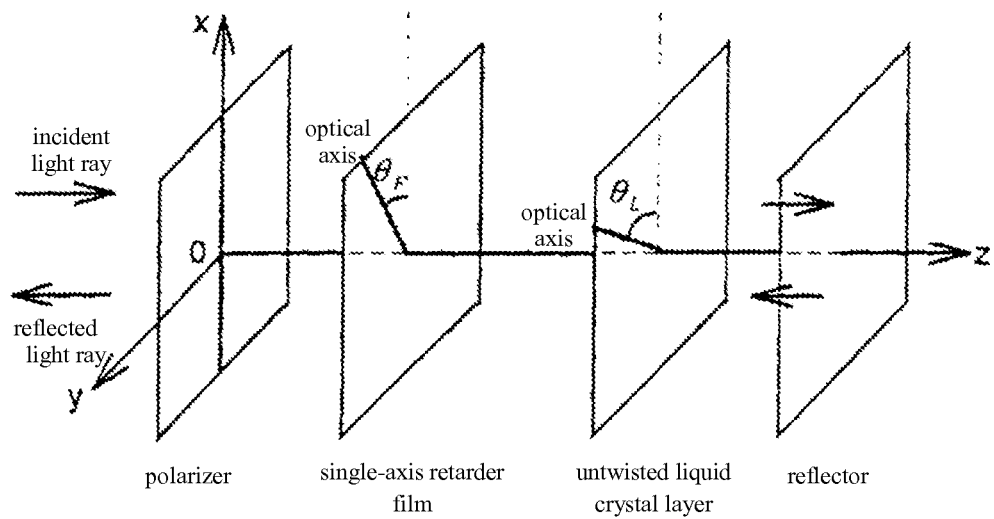
FIG. 2 is a schematic view showing an optical path of FIG. 1.

A process for the natural light incoming and exiting consists of passing through the polarizer, the phase retarder, the liquid crystal cell, the reflector, the liquid crystal cell, the phase retarder and the polarizer sequentially. FIG. 2 shows a simplified model. When the wavelength is $\lambda_0$, the refractive index of the entire model, upon optical calculation, may be expressed as:

$$R = \qquad (1)$$
$$[\cos\delta_F^0 \cos\delta_L^0 - \sin\delta_F^0 \sin\delta_L^0 \cos(2\theta_F - 2\theta_L)]^2 + \left[\cos^2\frac{\delta_F^0}{2}\sin\delta_L^0 \cos 2\theta_L - \sin^2\frac{\delta_F^0}{2}\sin\delta_L^0 \cos(2\theta_L - 4\theta_F) + \sin\delta_F^0 \cos\delta_L^0 \cos 2\theta_F\right]^2,$$

wherein $\delta_F^0$ represents the phase difference introduced by the phase retarder, $\delta_L^0$ represents the phase difference introduced by the liquid crystal layer, $\theta_F$ represents an angle between an optical axis of a wave plate and the incident light ray (i.e., an angle to the polarizer), and $\theta_L$ represents an angle between a longitudinal axis of liquid crystal molecules and the incident, linearly-polarized light ray. In addition, $$\delta_F^0 = \frac{2\pi}{\lambda_0} d_F \Delta n_F^0 \qquad (2)$$
$$\delta_L^0 = \frac{2\pi}{\lambda_0} d_L \Delta n_L^0,$$

wherein $d_F$ and $d_L$ represent a thickness of the phase retarder and a thickness of the liquid crystal layer, respectively, and $\Delta n_F^0$ and $\Delta n_L^0$ represent a difference between a refractive index of an ordinary light ray (O light ray) at the phase retarder and a refractive index of an extraordinary light ray (E light ray), and a difference between a refractive index of an ordinary light ray (O light ray) at the liquid crystal layer and the extraordinary light ray (E light ray), respectively.

For the reflective liquid crystal display in the normally-white mode, it is required to meet the following formulae:

$$\delta_F^0 = \pm\pi/2,\ \theta_F = \pm 45°,\ \delta_L^0 = \pi/2.$$

In other words, a necessary condition for the normally-white display is that the retarder produces a delay of a quarter wave, and the angle between the optical axis and the polarizer is ±45°. When no voltage is applied to the liquid crystal layer, the phase difference $\delta_L^0 = d_L \Delta n_L^0$ required to be introduced by the cell thickness is π/2 (in a bright state), and after a saturation voltage is applied, the phase difference of the liquid crystal layer is 0 (in a dark state).

For the reflective liquid crystal display in the normally-black mode, the retarder and the liquid crystal layer are required to meet the following formulae:

$$\delta_F^0 = \pm\pi,\ 2\theta_L - 4\theta_F = \pm 90°,\ \delta_L^0 = \pi/2.$$

In other words, a necessary condition for the normally-black display is that the retarder produces a delay of a half wavelength. When no voltage is applied to the liquid crystal layer, the phase difference $\delta_L^0 = d_L \delta n_L^0$ introduced by the liquid crystal layer is π/2 (in the dark state), and after the saturation voltage is applied, the phase difference of the liquid crystal layer is 0 (in the bright state). In addition, $\theta_F$ and $\theta_L$ are required to meet the formula $2\theta_L - 4\theta_F = \pm 90°$.

Because the light rays corresponding to the respective subpixels have different wavelengths, there will exist a phenomenon where it is not sufficiently black in the dark state or it is not sufficiently white in the bright state, i.e., there will exist a phenomenon of chromatic dispersion in the dark or bright state. In the case that the liquid crystal layer and the phase retarder each have a fixed thickness, it is impossible to eliminate the chromatic dispersion in both the dark and bright states at the same time.

For the liquid crystal display device in this embodiment, the light rays are modulated by the compensating unit, so that the phase difference of the light rays in the normally-black mode and the normally-white mode is within the predetermined range.

The compensating unit includes a film layer and a first electrode layer arranged at one side of the film layer. The first electrode layer includes subelectrodes each corresponding to the subpixel, and the subelectrode is configured to adjust the refractive index of a corresponding film layer region under the effect of a voltage, so as to adjust the phase difference offset of the light rays of the corresponding subpixels when the light rays pass through the compensating unit. To be specific, a control unit is used to control a electrode, so as to control a voltage applied to the subelectrodes in the first electrode layer corresponding to the respective subpixel, so as to adjust the refractive index of the corresponding film layer region. The control unit can be a controller, such as a PLC or a CPU, for controlling the voltage of the respective subelectrode.

Referring to FIG. 1 again, the compensating unit is specifically configured to adjust the delay of the light rays while it is in the compensating unit. The compensating unit includes the film layer 4 and a first electrode 3 arranged at one side of the film layer. The first electrode 3 includes a plurality of subelectrodes each corresponding to the subpixels, and the subelectrode is configured to adjust the refractive index of the corresponding film layer region under the effect of the voltage, so as to adjust the phase difference offset of the light rays of the corresponding subpixels when the light rays pass through the compensating unit. The first electrode 3 may be made by etching an ITO material, and the film layer 4 is a retarder. The film layer produces a delay of a quarter wavelength in the normally-white mode, and an angle between the optical axis direction and the polarizer is 45°. When no voltage is applied, the phase difference of the liquid crystal layer is π/2, and after the saturation voltage is applied, the phase difference of the liquid crystal layer is 0. The film layer provides a delay of a half wavelength in the normally-black mode. When no voltage is applied to the liquid crystal layer, the phase difference of the liquid crystal layer is 0, and after the saturation voltage is applied, the phase difference of the liquid crystal layer is π/2.

The film layer adjusts its refractive index for the light rays under the effect of the voltage, and it may be made of a polymer having an electro-optical effect, e.g., a polyimide-based polymer. Prior to being polarized for orienting, there is no anisotropy for the film layer, i.e., the material is centrosymmetrical. Various polarizing methods may be used to make the material non-centrosymmetrical. In this way, when the voltage is applied to both sides of the film layer, the refractive index thereof will be changed, thereby the phase difference will be introduced. The polymer film layer can be polarized by corona polarization or photothermal polarization, etc. For the normally-white mode or normally-black mode, it is required to determine a polarization direction, so that the direction of the optical axis can meet the display requirements.

In this embodiment, the polymer film layer having an electro-optical effect is introduced, so as to polarize the material non-linearly under the effect of an electric field by its electro-optical effect, thereby to produce optical anisotropy thereof and produce the phase difference when the light rays pass through. When the electric field E is applied, the refractive index of the material will be changed to:

$$\Delta n = \frac{1}{2} n^3 \gamma E,$$

wherein γ represents an electro-optical coefficient. In the case that γ is fixed, the refractive index will change along with the electric field, thereby, the phase difference can be adjusted by means of the electric field, so as to adjust the light intensity by means of the electric field, i.e., it is able to compensate the phase.

Based on the above-mentioned principle, it is possible to apply different voltages to the wave plate at the positions corresponding to R, G and B, respectively, so as to compensate the phase. As a result, it is able to reduce the light leakage in the dark state and reduce the chromatic aberration in the bright state, thereby to enable the phase difference offset of the light rays passing through the respective subpixels in the normally-black mode and/or the normally-white mode to be within the predetermined range.

Referring to FIG. 1 again, the liquid crystal display device further includes a second electrode layer 5 arranged at the other side of the film layer, and the second electrode layer is a common electrode. In this embodiment, the common electrode, which is used to provide a reference voltage, can be a complete electrode plate or a plurality of subelectrodes corresponding to the first electrode.

Figure 4:
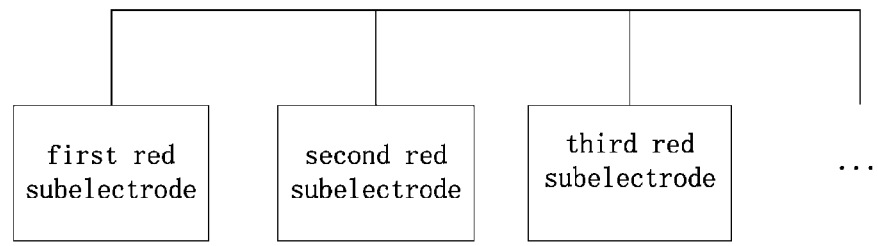
FIG. 4 is a schematic view showing parallel connection of red subelectrodes.

The subelectrodes corresponding to the red, green or blue subpixels respectively are connected parallel to each other. In another word, the red subelectrodes corresponding to the red subpixels are connected parallel to each other, the green subelectrodes corresponding to the green subpixels are connected parallel to each other, and the blue subelectrodes corresponding to the blue subpixels are connected parallel. FIG. 4 illustrates parallel connection of a first red subelectrode, a second red subelectrode, and a third red subelectrode, etc. corresponding to a first red subpixel, a second red sub pixel, and a third red subpixel etc., respectively. The green subelectrodes are connected and the blue subelectrodes are connected in a similar manner. Because the light rays of the same color have the same wavelength, it is able to adjust the refractive index of the light rays of the same color at the same time, thereby to adjust the refractive index of the film layer corresponding to the subpixels of the same color at the same time too.

In this embodiment, by controlling the voltages applied to both sides of the polymer layer, it is able to adjust the refractive indices of the polymer layer for the light rays of the colors R, G and B respectively, thereby to generate optical rotation, and compensate the phases of the light rays of primary colors. The polymer layer may be used together with the liquid crystal layer and the polarizer of an upper substrate so as to control the transmittance of different light rays, thereby to improve a gray scale of the reflective LCD.

The liquid crystal display device further includes a glass substrate 9 and a black matrix 7. The glass substrate 9 is provided at one side of the color film layer 6, and the black matrix 7 is arranged between the color film layer 6 and the glass substrate 9. The first electrode 3 is arranged on the color film layer, the film layer 4 is arranged on the first electrode 3, and the common electrode is arranged on the film layer 4.

The present invention is adapted to a TN display mode, and of course, it may also be adapted to the other display modes such as IPS, VA and FFS. In other words, the electro-optical polymer is used in the liquid crystal display device so as to achieve the phase adjustment, and the compensated reflective or semi-transmissive-semi-reflective liquid crystal display such as an IPS-type or VA-type liquid crystal display.

Figure 5:
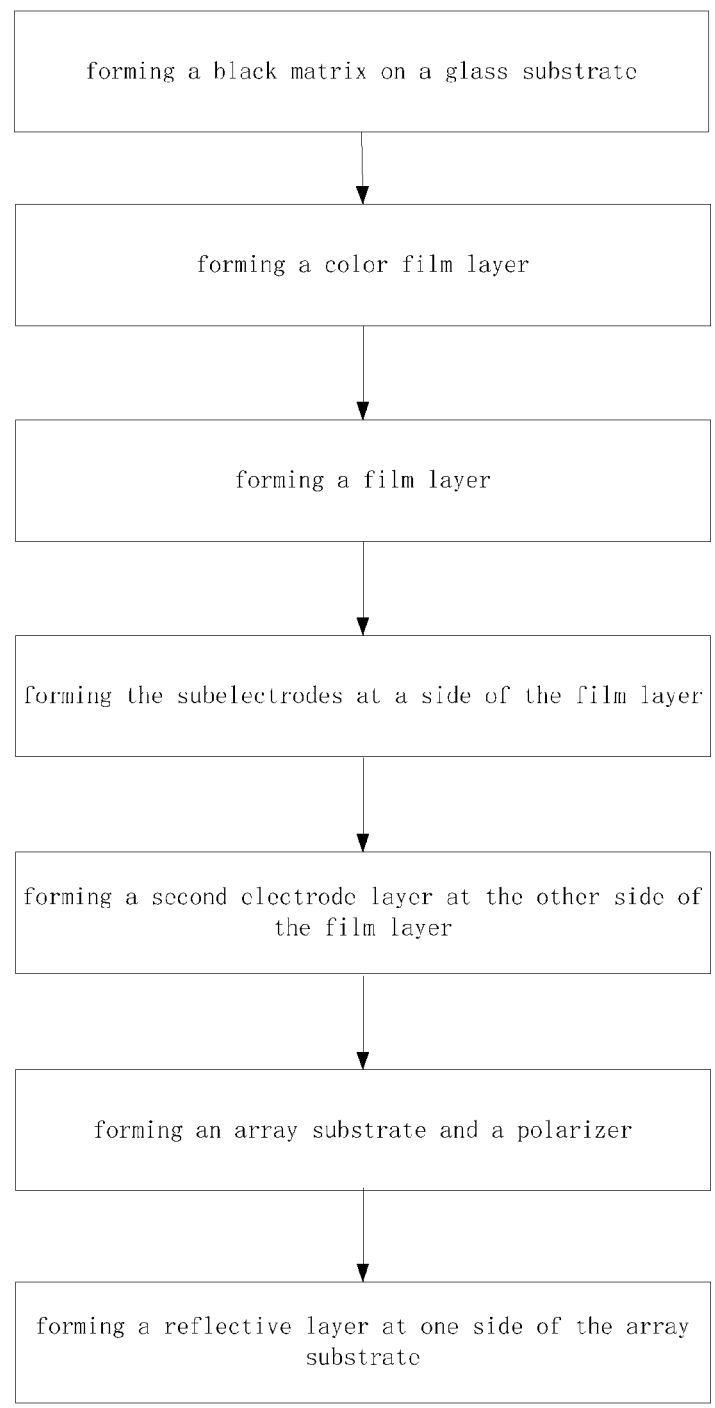
FIG. 5 is a flow chart showing a method for manufacturing a liquid crystal display device according to one embodiment of the present invention.

Referring to FIG. 5, the present invention further provides a method for manufacturing a liquid crystal display device, including the steps of:

forming a color film layer having red, green and blue subpixels; and forming, at one side of the color film layer, a film layer for adjusting phase difference offset of light rays of the corresponding subpixels, and forming, at a side of the film layer, subelectrodes corresponding to the respective subpixels.

Alternatively, the subelectrodes corresponding to the red, green or blue subpixels respectively are connected parallel to each other.

Alternatively, the method further includes forming an array substrate and a polarizer, and forming a reflective layer at one side of the array substrate.

The method for manufacturing the liquid crystal display device will be described hereinafter in conjunction with the drawings. The structure of the liquid crystal display panel and the manufacturing method therefor are known in the art, and thus will not be repeated herein.

1. The reflective layer made of aluminum is deposited on the glass substrate, and a buffer layer is deposited on the reflective layer, so as to prevent a short circuit due to the contact of a TFT array electrode with the reflective layer. Then, a TFT array and a liquid crystal alignment layer are manufactured by the known methods, so as to obtain an array substrate.

2. As shown in FIG. 3, a color film substrate is manufactured. The black matrix (BM) 7 and the color film layer 6 of the colors R, G and B are sequentially formed on the glass substrate 9 by the known methods. ITO electrodes are deposited on the color film layer 6 by magnetron sputtering, and then, the ITO electrodes will be coated, exposed, etched and removed, so as to form bar-like electrodes corresponding to the red, green and blue subpixels, respectively. Besides, the ITO electrodes corresponding to the pixels of the same color are connected parallel to each other, so as to ensure that an identical voltage is applied thereto when they are at work. At this time, three electrodes are led out from the color film substrate, so as to apply the compensating voltages corresponding to the colors R, G and B, respectively.

3. As shown in FIG. 3, the polymer compensating film layer 4 is formed by spinning. The polymer may be a polyimide-based polymer, and the thickness of the film layer needs to be designed according to the display mode (normally-black or normally-white) and the electro-optical coefficient of the material. When designing, a certain monochromatic light ray (e.g., G) among the light rays of the primary colors R, G and B may be used as a basis. For the normally-white mode, the film layer is designed as a quarter-wavelength retarder, i.e., $$d_L \cdot \Delta n_L^0 = \frac{1}{4}\lambda_G,$$

and for the normally-black mode, the film layer is designed as a half-wavelength retarder, i.e., $$d_L \cdot \Delta n_L^0 = \frac{1}{2}\lambda_G$$

The liquid crystal layer has a thickness so that: (1) when no voltage is applied, a phase difference introduced by the liquid crystal layer for $\lambda_G$ is 90°; and (2) when a saturated voltage is applied, the phase difference introduced by the liquid crystal layer for $\lambda_G$ is 0°, i.e., the liquid crystal molecules are completely overturned, and the light rays directly pass therethrough. The angle between the liquid crystal layer and the polarizer needs to meet the requirements of the above formula on the normally-white and normally-black modes.

4. An ITO common electrode (as shown in FIG. 3) is deposited on the polarized polymer phase retarder layer by sputtering, so as to form an ITO film layer, which is also called as a common electrode layer. This common electrode is configured to control, together with a pixel electrode on a lower substrate, the deflection of the liquid crystal molecules in the liquid crystal cell, and control, together with the ITO electrode on the polymer compensating layer, the voltages applied to both sides of the polymer, so as to adjust the refractive index of the polymer film layer.

Using the known methods, the liquid crystal alignment layer is formed on the ITO film layer, the polarizer is formed on the other side of the color film substrate glass, and the subsequent processes such as arranging the substrates oppositely to form a cell is completed.

The above are merely the preferred embodiments of the present invention. It should be appreciated that, a person skilled in the art may make further improvements and modifications without departing from the principle of the present invention, and these improvements and modifications also fall within the scope of the present invention.

What is claimed is:

1. A liquid crystal display device, comprising a liquid crystal layer, a color film layer and a polarizer arranged at one side of the liquid crystal layer, and a reflective layer arranged at the other side of the liquid crystal layer, the color film layer comprising a plurality of pixels consisting of red, green and blue subpixels, the liquid crystal display device further comprises:

a compensating module which includes a compensating unit corresponding to the plurality of subpixels, the compensating unit is configured to adjust phase difference offset of light rays of the corresponding subpixels when the light rays pass through the compensating unit, so that a phase difference between the light rays passing through the corresponding subpixels in a normally-black mode and/or a normally-white mode is within a predetermined range, wherein the compensating unit includes a film layer and a first electrode layer arranged at one side of the film layer; the first electrode layer includes subelectrodes each corresponding to the subpixel and the subelectrode is configured to adjust a refractive index of a corresponding film layer region under the effect of a voltage, so as to adjust the phase difference offset of the light rays of the corresponding subpixel when the light rays pass through the compensating unit.

2. The liquid crystal display device according to claim 1, further comprising a control unit configured to control a voltage of the subelectrodes in the first electrode layer corresponding to the respective subpixels, so as to adjust the refractive index of the corresponding film layer region.

3. The liquid crystal display device according to claim 2, further comprising a second electrode layer arranged at the other side of the film layer, wherein the second electrode layer is a common electrode.

4. The liquid crystal display device according to claim 3, wherein the common electrode is an electrode plate or a plurality of subelectrodes corresponding to a first electrode.

5. The liquid crystal display device according to claim 3, wherein the subelectrodes corresponding to the red, green or blue subpixels respectively are connected parallel to each other.

6. The liquid crystal display device according to claim 1, wherein the film layer is made of a polymer having an electro-optical effect.

7. The liquid crystal display device according to claim 6, wherein the polymer is a polyimide-based polymer.

8. The liquid crystal display device according to claim 1, further comprising a glass substrate and a black matrix arranged between the color film layer and the glass substrate.

9. A method for manufacturing the liquid crystal display device according to claim 1, comprising:
forming the color film layer; and
forming, at one side of the color film layer, the film layer, and forming, at a side of the film layer, the subelectrodes.

10. The method according to claim 9, wherein the subelectrode is formed by etching an ITO material.

11. The method according to claim 9, wherein the subelectrodes corresponding to the red, green or blue subpixels respectively are connected parallel to each other.

12. The method according to claim 9, further comprising:
forming an array substrate and a polarizer; and
forming a reflective layer at one side of the array substrate.

13. The method according to claim 11, further comprising:
forming an array substrate and a polarizer; and
forming a reflective layer at one side of the array substrate.

14. The method according to claim 9, wherein prior to forming the color film layer and the subelectrodes, the method further comprises forming a black matrix and the color film layer sequentially on a glass substrate.

15. The method according to claim 9, wherein the film layer is made of a polyimide-based polymer.

16. The method according to claim 9, further comprising forming a second electrode layer at the other side of the film layer, wherein the second electrode layer is a common electrode.

17. The method according to claim 9, wherein the liquid crystal layer has a thickness so that: (1) when no voltage is applied, a phase difference introduced by the liquid crystal layer for $\lambda_G$ is 90°; and (2) when a saturated voltage is applied, the phase difference introduced by the liquid crystal layer for $\lambda_G$ is 0°.

18. The method according to claim 14, further comprising forming a polarizer at the side of the color film layer where the film layer is arranged.

* * * * *